United States Patent
Cheong et al.

(10) Patent No.: US 6,961,300 B2
(45) Date of Patent: Nov. 1, 2005

(54) OPTICAL RECORDING MEDIUM HAVING FIRST AND SECOND SUPER-RESOLUTION LAYERS

(75) Inventors: Byung-ki Cheong, Seoul (KR); Soon-Gwang Kim, Gyeonggi-Do (KR); Won-Mok Kim, Seoul (KR); Moonkyo Chung, Seoul (KR); Taek-Sung Lee, Seoul (KR); Sung-Jin Park, Seoul (KR); Sung-Hun Lee, Daegu (KR); Sung-Hun Cho, Jeollanam-Do (KR)

(73) Assignee: Korea Institute of Science and Technology, Seoul (KR)

( * ) Notice: Subject to any disclaimer, the term of this patent is extended or adjusted under 35 U.S.C. 154(b) by 240 days.

(21) Appl. No.: 10/186,016

(22) Filed: Jun. 28, 2002

(65) Prior Publication Data

US 2003/0002428 A1 Jan. 2, 2003

(30) Foreign Application Priority Data

Jun. 29, 2001 (KR) ........................................ 2001-38257

(51) Int. Cl.[7] ................................................ G11B 7/24
(52) U.S. Cl. .................................. 369/275.1; 428/64.4
(58) Field of Search ................................ 369/280, 281, 369/283, 286, 275.2, 275.1, 275.5; 428/64.1, 64.4, 64.3; 430/320, 321, 270.13

(56) References Cited

U.S. PATENT DOCUMENTS

| | | | | |
|---|---|---|---|---|
| 5,153,873 A | * | 10/1992 | Spruit et al. ............. | 369/275.2 |
| 5,315,573 A | * | 5/1994 | Nakao et al. ............... | 369/100 |
| 5,323,372 A | * | 6/1994 | Puech et al. ............. | 369/275.2 |
| 5,420,846 A | * | 5/1995 | Sugiyama et al. ....... | 369/275.2 |
| 6,285,652 B1 | * | 9/2001 | Tsai et al. ................. | 369/275.1 |
| 6,339,582 B1 | * | 1/2002 | Ichihara et al. .......... | 369/275.2 |
| 6,410,115 B1 | * | 6/2002 | Tsai et al. ................... | 428/64.1 |
| 6,411,591 B1 | * | 6/2002 | Moritani et al. ......... | 369/275.2 |
| 6,524,766 B1 | * | 2/2003 | Ariyoshi et al. ....... | 430/270.13 |
| 6,670,016 B1 | * | 12/2003 | Kim et al. ................. | 428/64.4 |

FOREIGN PATENT DOCUMENTS

| JP | 2003-123318 A | * | 4/2003 | .............. | 369/275.2 |
|---|---|---|---|---|---|

* cited by examiner

Primary Examiner—Tan Dinh
(74) Attorney, Agent, or Firm—Scully, Scott, Murphy & Presser

(57) ABSTRACT

The present invention provides an optical recording medium in which the spot size of incident laser beam, focused on the medium by a far-field optic system characterized by λ and NA, is further reduced and maintained below the diffraction-limited size by means of material characteristics of the medium while reproducing from and recording on the information layer of the recording medium, thus making it possible to record and reproduce a high density of information exceeding the resolution limit of the optic system.

A high density optical recording medium according to the present invention adopts a combination of two different super-resolution layers of mutually complementary optical characteristics with increasing light power.

The combination of two super-resolution layers is made in either of two different types: for one type, each of the two super-resolution layers, having a respective threshold light intensity (or temperature) for the onset of change in optical transmittance, produces an increasing spot size of the transmitted beam with increasing light power once a respective threshold light intensity (or temperature) is exceeded, and for the other type, one layer produces an increasing spot size of the transmitted beam with increasing light power whereas the other layer exhibits a reverse trend.

14 Claims, 9 Drawing Sheets

OPTICAL RECORDING MEDIUM HAVING FIRST AND SECOND SUPER-RESOLUTION LAYERS

BACKGROUND OF THE INVENTION

1. Field of the Invention

The present invention relates to a high density optical recording medium with a self-sustaining capability to diminish the spot size of an incident focused laser beam below a diffraction-limited size during recording and readout of information, and more particularly, to an optical recording medium in which purposely combined layers of medium materials can reduce additionally the spot size of a laser beam, once focused and irradiated on the recording medium through a far field optic system, to below a diffraction-limited size and maintain it during recording as well as readout and therefore result in a remarkable increase in storage density.

2. Description of the Background Art

A primary method to boost the recording density of an optical recording medium is to reduce the spot size of a laser beam in use for recording and reproducing information. When a laser beam of a wavelength $\lambda$ with a Gaussian intensity profile is focused through the objective lens of a numerical aperture NA, it has a full width half maximum (FWHM) spot size of 0.59 $\lambda$/NA at diffraction limit, setting a limit in readout resolution to 2NA/$\lambda$ in terms of a spatial frequency. Accordingly, in order to achieve a high density for an optical recording medium by use of a diffraction-limited focused light, it is necessary to reduce the wavelength $\lambda$ or to increase the numerical aperture of the objective lens. However, optical recording technology has already proceeded to use of laser light with a shortest wavelength in the visible regime ($\lambda$=405 nm) as well as a high NA (=0.85), and a storage density is considered to have come close to the theoretical limit in this line of approach.

Numerous techniques have been proposed to overcome light diffraction limit and thereby to accomplish a high density recording and readout. Among them, super-resolution techniques make it possible to reproduce a high density information of a spatial frequency above 2NA/$\lambda$ by use of a reduced beam spot relative to the one at diffraction limit, which derives from optical, thermo-structural or thermo-magnetic characteristics of materials of an optical recording medium. These techniques have a remarkable advantage over other techniques that a high density can be achieved beyond that of diffraction limit, yet on the basis of a far-field optic system of the existing optical recording devices.

Led by a U.S. Pat. No. 5,153,873 which discloses a super-resolution optical recording medium including a single layer nonlinear material, super-resolution techniques have been proposed utilizing various groups of materials such as thermochromic materials, photochromic materials, phase change materials, optical bistable materials, saturable-absorption materials, and higher-order nonlinear optical materials.

Each of these super-resolution techniques makes use of a single super-resolution layer in an optical recording medium to produce a laser beam spot smaller than the one at diffraction limit during readout, but mostly neglects the problem of a varying spot size of the transmitted light (hereafter transmitted light is used to refer to light transmitted through a super-resolution layer unless specified otherwise) with incident light power.

Accordingly, any of such techniques may not be applied successfully to a recordable or a rewritable type optical recording medium for which a reduced spot size is required during readout and recording as well in order to achieve a higher storage density than what is accessible with diffraction-limited light.

U.S. Pat. No. 5,420,846 discloses a method to overcome such a problem utilizing a single layer of a super-resolution material that exhibits a two-step change in optical transmittance with increasing light intensity. It should be of limited applicability, however, due to rare and severely imposing material characteristics required of a super-resolution layer.

Therefore, a method is called for that provides a reduced spot size below a diffraction-limited size during readout and recording as well while offering a much wider window of choice of materials for super-resolution.

SUMMARY OF THE INVENTION

The objective of the present invention is to provide an optical recording medium in which the spot size of incident laser beam, focused on the medium by a far-field optic system characterized by $\lambda$ and NA, is further reduced and maintained below the diffraction-limited size by means of material characteristics of the medium while reproducing from and recording on the information layer of the recording medium, thus making it possible to record and reproduce a high density of information exceeding the resolution limit of the optic system.

To achieve the purpose and the advantages of the present invention, as embodied and broadly described herein, there is provided an optical recording medium that incorporates a combination of two different super-resolution layers with mutually complementary characteristics of variation in the spot size of transmitted light with increasing laser power.

According to the present invention, combination of two super-resolution layers is made in either of two different types: for one type, each of the two super-resolution layers, having a respective threshold light intensity (or temperature) for the onset of change in optical transmittance, produces an increasing spot size of the transmitted light with increasing laser power once a respective threshold light intensity (or temperature) is exceeded, and for the other type, one layer produces an increasing spot size of the transmitted light with increasing laser power in the same way as above whereas the other layer exhibits a reverse trend.

As for the first type, each of the two layers is respectively made of a phase change material, a thermochromic material or a photochromic material which is belongs to the group of materials displaying a discontinuous change in the optical characteristics according to a change in structure or chemistry at a threshold light intensity (or temperature).

As for the second type, one of the two super-resolution layers is made of a phase change material, a thermochromic material or a photochromic material whereas the other layer is made of a self-focusing material with a third order nonlinear optical effect or a saturable-absorption material which belongs to the group of materials displaying a continuous change in the optical characteristics with increasing light intensity (or temperature) above a threshold value.

The foregoing and other objectives, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and constitute a part of this specification, illustrate embodiments of the invention and serve to explain the principles of the invention together with the description.

In the drawings.

DETAILED DESCRIPTION OF THE PREFERRED EMBODIMENTS

Reference will now be made in detail to the preferred embodiments of the present invention, examples of which are illustrated in the accompanying drawings.

Single layers of super-resolution materials utilized in the existing super-resolution techniques to effect reduction of the spot size of incident focused light below a diffraction-limited size can be roughly divided into two different kinds on the basis of the way that optical transmittance (ratio of transmitted light intensity to incident light intensity) varies with incident light intensity and similarly the way that the spot size of transmitted light changes with incident light power.

Figure 1A:
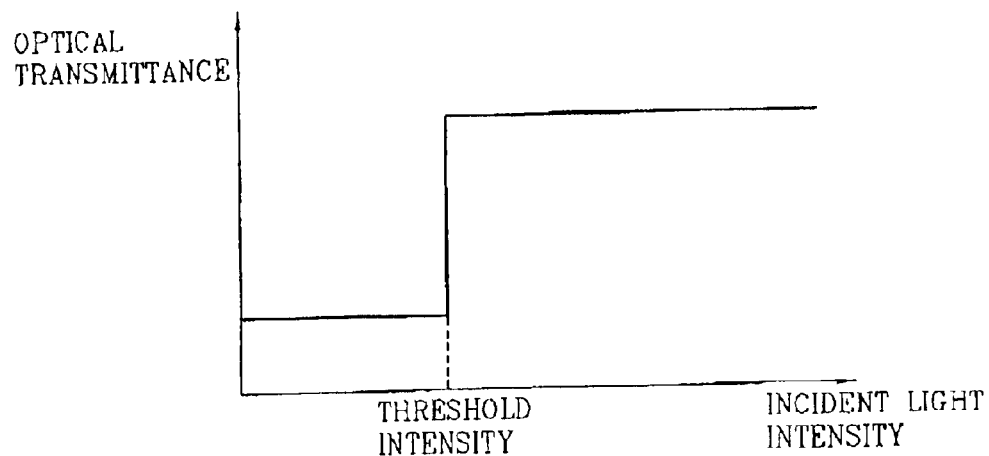
FIG. 1A is a graph showing a variation in optical transmittance with incident light intensity for the super-resolution layer of a first kind.

In case of the super-resolution layer of a first kind, as shown in FIG. 1A, optical transmittance changes discontinuously once light intensity or temperature rise due to light absorption exceeds a threshold intensity or a threshold temperature with increasing incident light power.

Figure 1B:
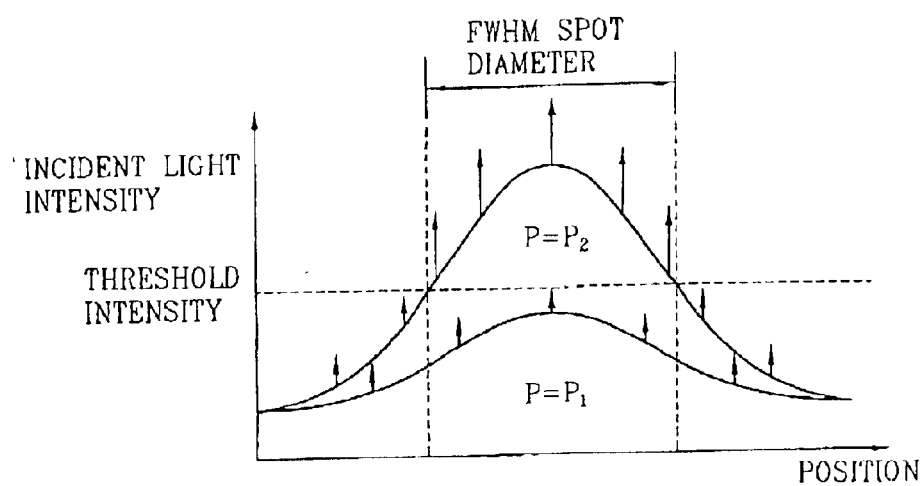
FIG. 1B is a graph showing distributions of optical transmittance along the intensity profiles of incident light at two different powers ($P_2>P_1$) for the super-resolution layer of a first kind.

In conjunction with FIG. 1A, FIG. 1B schematically illustrates how incident light may change in its intensity profile, upon transmission through the super-resolution layer, with increasing incident light power ($P_2>P_1$). At a lower power ($P_1$), optical transmittance is uniform and low (denoted by shorter arrows) along the Gaussian intensity profile of the incident light but, at a higher power ($P_2$) the intensity profile bears a portion around the center where light intensity exceeds a threshold value to yield a higher optical transmittance (denoted by longer arrows) than that of the peripheral portion (the central region of the super-resolution layer with a different optical transmittance from the rest is denoted hereafter as an aperture). The size of the aperture increases with increasing incident light power.

Figure 1C:
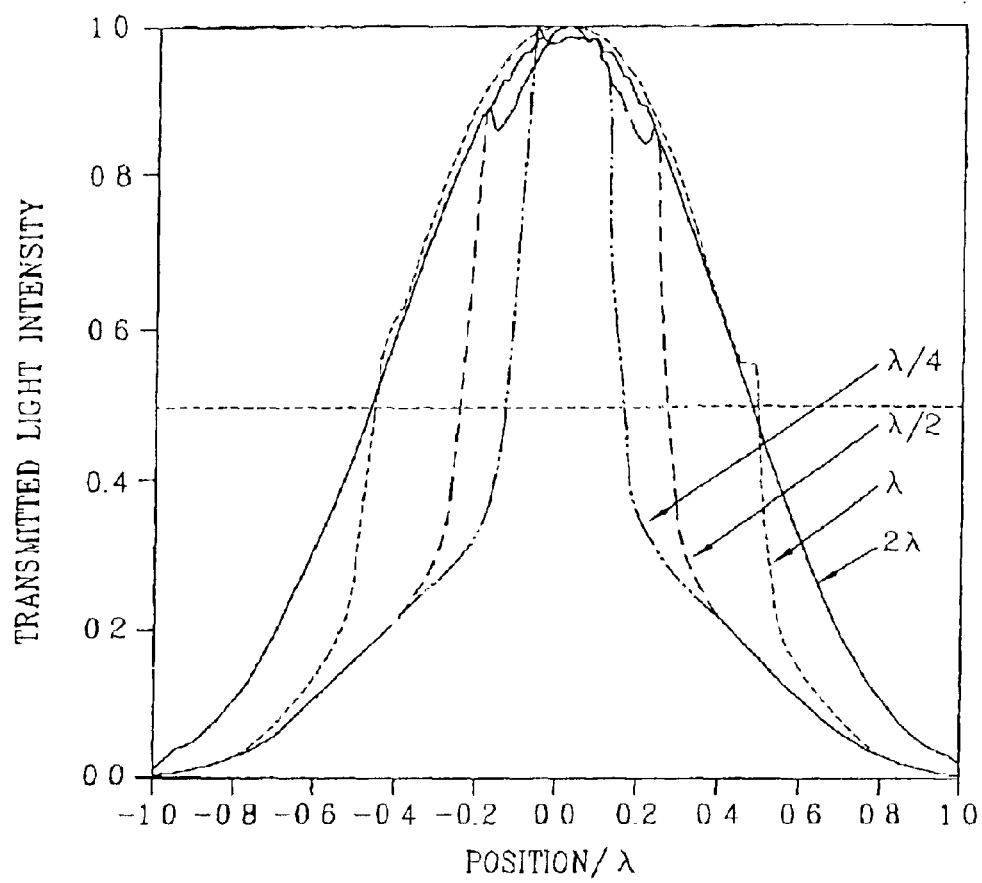
FIG. 1C is a graph showing the intensity profiles of transmitted light for various sizes of an 'aperture' portion in the super-resolution layer of a first kind.

Shown in FIG. 1C is an example to illustrate the near field intensity profile of the transmitted light through a circular aperture of a varying diameter $\lambda/4$, $\lambda/2$, $\lambda$ and $2\lambda$) in a super-resolution layer, computed from a finite difference time domain (FDTD) analysis of the Maxwell's equations. For computation, light having the wavelength ($\lambda$) of 650 nm is made incident, through an objective lens with a numerical aperture (NA) of 0.6, onto a super-resolution layer of 10 nm thick made of a Ge-Sb-Te phase change material with the optical transmittance of 29% at the aperture region, and 11% at the peripheral region. Each computed intensity profile was taken from the same plane lying 15 nm apart from and parallel to the exit plane of the super-resolution layer and along the same line bearing a respective intensity maximum normalized to 1. It is noticed that the intensity profile of the transmitted light deviates more remarkably from the Gaussian profile with the size of an aperture getting smaller. In addition, the FWHM spot size of the transmitted light is found to have about the same size as that of the aperture when the aperture is smaller than the FWHM size (~$\lambda$) of the incident light whereas it has the FWHM spot size of the incident light regardless of the size of the aperture otherwise.

Figure 1D:
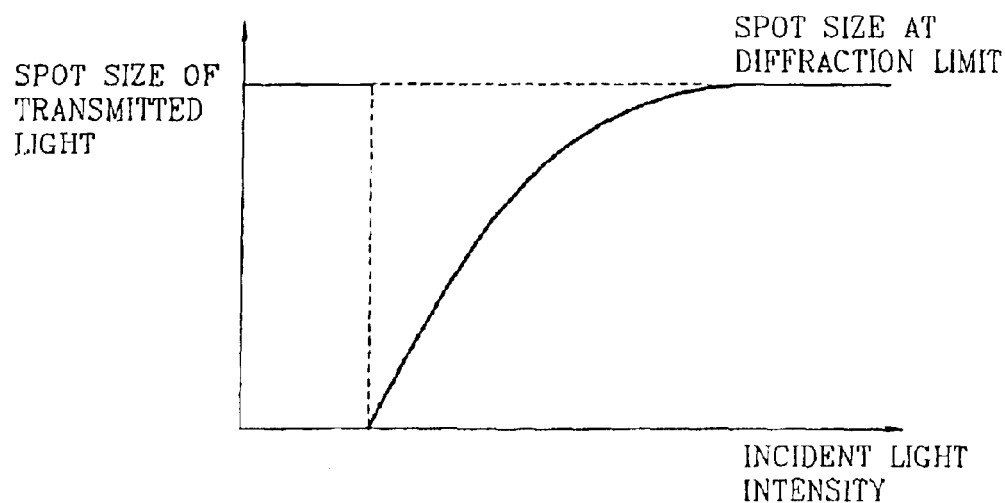
FIG. 1D is a graph showing a variation in the spot size of transmitted light with incident light power for the super-resolution layer of a first kind.

FIG. 1D shows a relationship between the spot size of the transmitted light and incident light power for the super-resolution layer of a first kind.

Figure 2A:
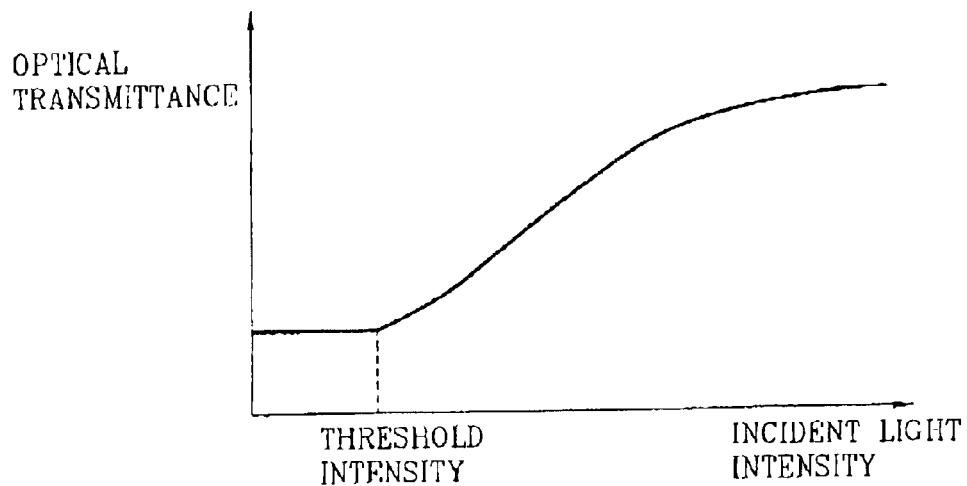
FIG. 2A is a graph showing variation in optical transmittance with incident light intensity for the super-resolution layer of a second kind.

In case of the super-resolution layer of a second kind, optical transmittance tends to increase not discontinuously but gradually once light intensity exceeds a threshold value with increasing incident light power, as shown in FIG. 2A.

Figure 2B:
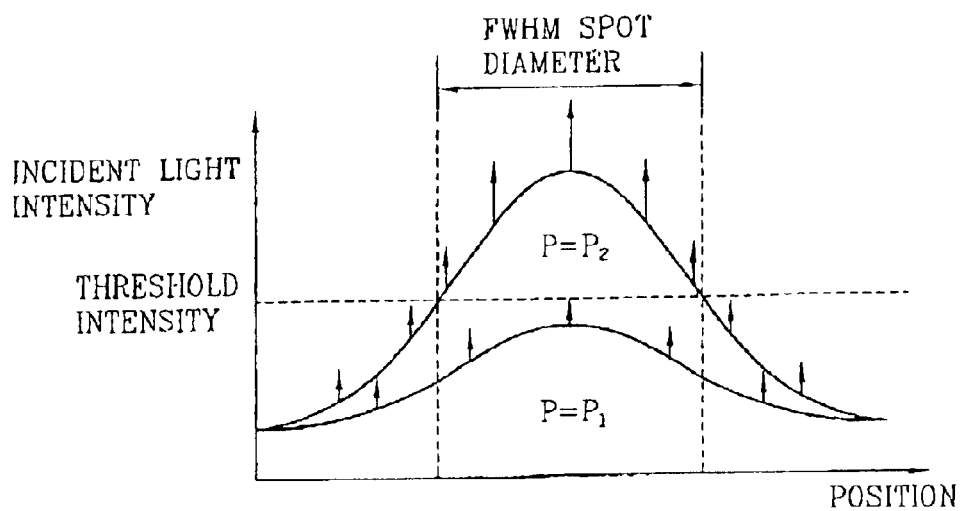
FIG. 2B is a graph showing distributions of optical transmittance along the intensity profiles of incident light at two different powers for the super-resolution layer of a second kind.

In relation to this, FIG. 2B schematically shows how incident light may change in its intensity profile, upon transmission through the super-resolution layer, with increasing power. In FIG. 2B, the arrows indicate the relative magnitudes of optical transmittance according to the local intensity of incident light along each intensity profile. Compared with FIG. 1B, it is noticed that, at a higher power, the intensity profile bears a portion around the center where light intensity exceeds a threshold value, yielding a gradual increase of optical transmittance with light intensity.

Figure 2C:
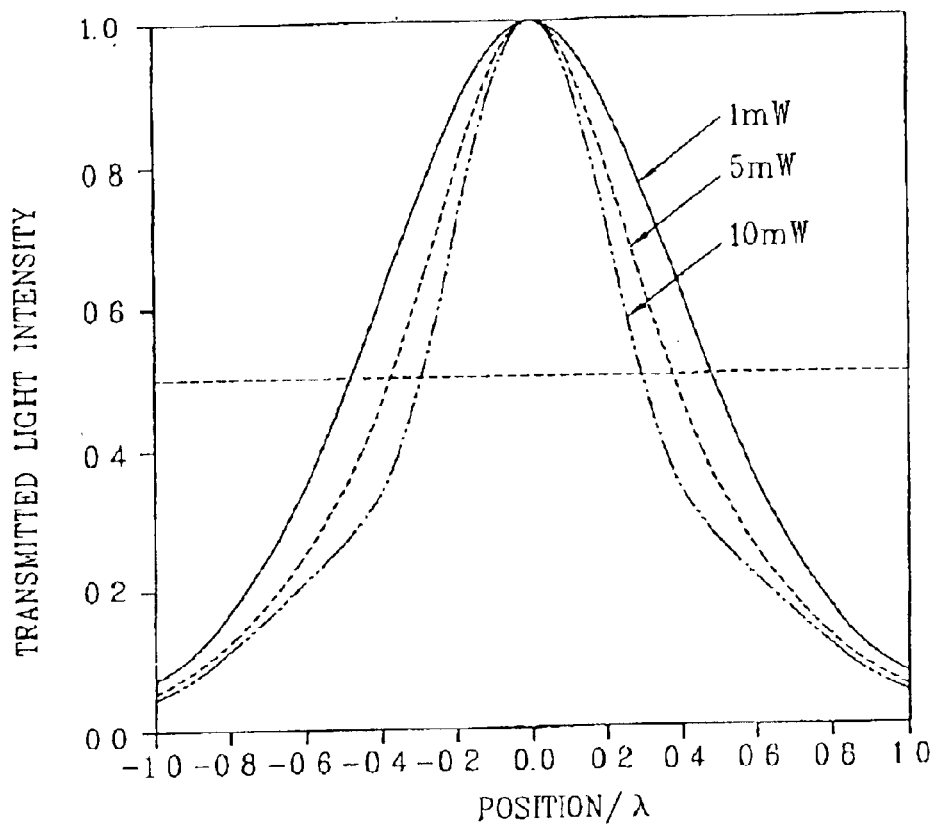
FIG. 2C is a graph showing the intensity profiles of transmitted light for various incident light powers for the super-resolution layer of a second kind.

Due to these characteristics, the intensity profile of transmitted light varies with incident light power as illustrated in FIG. 2C. As for the results of FIG. 2C, a self-focusing material $As_2S_3$ was considered as a super-resolution material on the basis of a non-paraxial theory of self-focusing optics. For computation, light having the wavelength ($\lambda$) of 650 nm was made incident, through an objective lens with a numerical aperture (NA) of 0.6, onto the self-focusing material of a fixed thickness and the resulting intensity profile at the end of light propagation through the material was obtained and normalized with respect to the respective peak intensity value. In contrast with the case of the super-resolution layer of a first kind, it is noticed that the FWHM spot size of the transmitted light gradually decreases as incident light power increases beyond the threshold intensity.

Figure 2D:
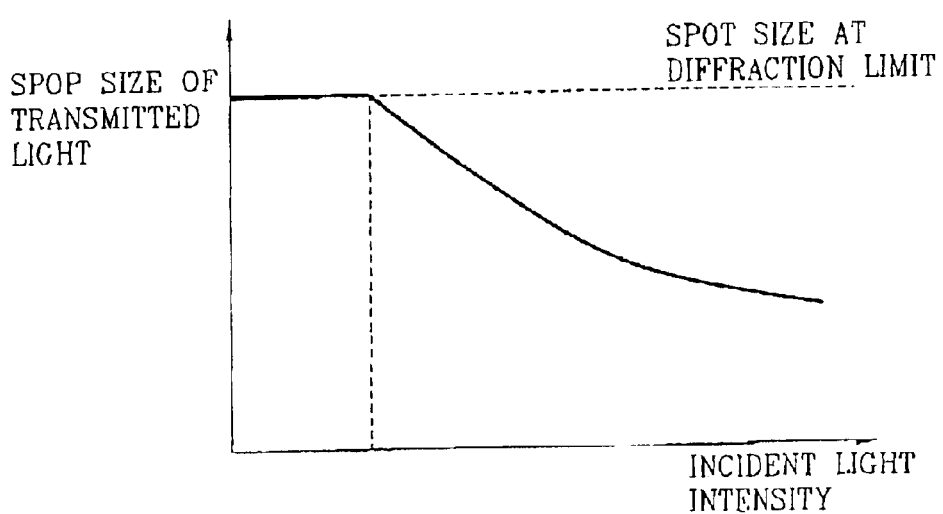
FIG. 2D is a graph showing a variation in the spot size of transmitted light with incident light power for the super-resolution layer of a second kind.

FIG. 2D shows a relationship between the spot size of transmitted light and incident light power for the super-resolution layer of a second kind.

Examples of preferable materials for the aforementioned super-resolution layer of each kind are provided but are not intended to limit the scope of the present invention.

A super-resolution material of a first kind is discontinuous structurally and chemically at a threshold intensity (temperature), having a transition between phases with different linear refractive indices and extinction coefficients and is selected among thermochromic materials, photochromic materials and phase change materials.

The thermochromic materials include, for example; organic mixtures, each consisting of a dye among fluorans, crystal violet lactone, spiropyrans, fulgides, and the like and of a developer among bisphenol A, octyl p-hydroxybenzoate, methyl p-hydroxybenzoate, 1,2,3-triazoles, 4-hydroxycoumarin derivatives and the like; or transition metal oxides such as $VO_2$; or inorganic compounds such as $Cu_2HgI_4$ and $Ag_2HgI_4$.

The photochromic materials include, for example, spiropyran, spirooxazine, azobenzene, fulgide, indigo, diarylethene, triarylmethane and diarylethene compounds; or polymer liquid crystals such as cyanobiphenyl and cyanophenyl benzoute; or composite materials consisting of a glass or a polymer matrix dispersed with one or more than two kinds of Azo dyes selected among 4-dimetnylaminoazobenzene, thioindigos, o-hydroxyben, silideneaniline, o-nitrobenzyl, dithizone metals, spyropyran compounds, triphenylmethane dyes and halogenated silver; or organic dyes such as cyanine dyes, merocyannine dyes, triphenylmethane dyes, rhodamine dyes, phthalocyanine dyes, naphthaiocyanine dyes, p-oligophenylene, exazole, oxazole derivations, stilbene derivatives, coumarinic derivatives, xanthene dyes and oxazin dyes.

The phase change materials include, for example, materials with phase transitions between solid phases such as AgZn and CuAlNi; or materials with decomposition of compounds such as $Ag_2O$; or materials with solid-liquid phase transitions such as chalcogenide alloys like Ge—Sb—Te and In—Sb—Te and pure metals such as In, Te, Bi, Pb, Sn, and Sb; or composite materials consisting of these alloys or pure metals dispersed in dielectric matrices.

In contrast to a first kind, a super-resolution material of a second kind has neither structural nor chemical change at a threshold intensity but undergoes a gradual change in optical characteristics as light intensity increases beyond the threshold value.

As a typical example, there exists a group of materials, called self-focusing materials, that have intensity-dependent capability of focusing light due to third order nonlinear optical effect. Such a material has a refractive index with a nonlinear component growing proportional to light intensity so as to yield intensity-dependent self-focusing effect accordingly: $n=n_0+n_2 I$ where n, $n_0$, $n_2$ and $I$ are refractive index, linear refractive index, nonlinear refractive index and light intensity, respectively.

Materials having large nonlinear refractive indices include monolithic materials such as $As_2S_3$, a—Si, and InSb, metal-dielectric composites such as $Cu—SiO_2$, $Ni—SiO_2$, $Cu—Ni—SiO_2$ and $Cu—Al_2O_3$, or composite materials consisting of semiconductor quantum dots dispersed in dielectrics such as GaAs quantum dots in $SiO_2$.

Besides, there are saturable-absorption materials displaying respectively a gradual change in optical transmittance over a wide range of light intensity beyond a threshold value. Examples include composite materials, each comprising a II–VI group compound such as CdS, CdSe, CdTe, ZnO or ZnTe or a III–V group compound such as GaAs, GaP, GaN, AlAs, AlP or AlSb, dispersed in a matrix made of a glass or a resin.

The chalcogenide phase change materials, classified above as super-resolution materials of a first kind, are also known to have temperature-dependent refractive indices and extinction coefficients even below temperatures for phase transitions so that they are expected to behave much like super-resolution materials of a second kind in the respective temperature regime concerned.

Figure 3A:
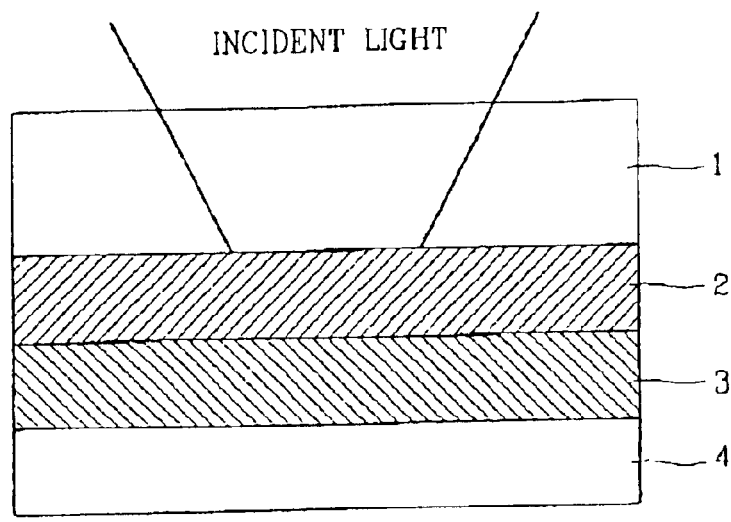
FIGS. 3A through 3C respectively shows a basic constitution of the optical recording medium using two super-resolution layers according to the first, the second and the third embodiment of the present invention.
Figure 3B:
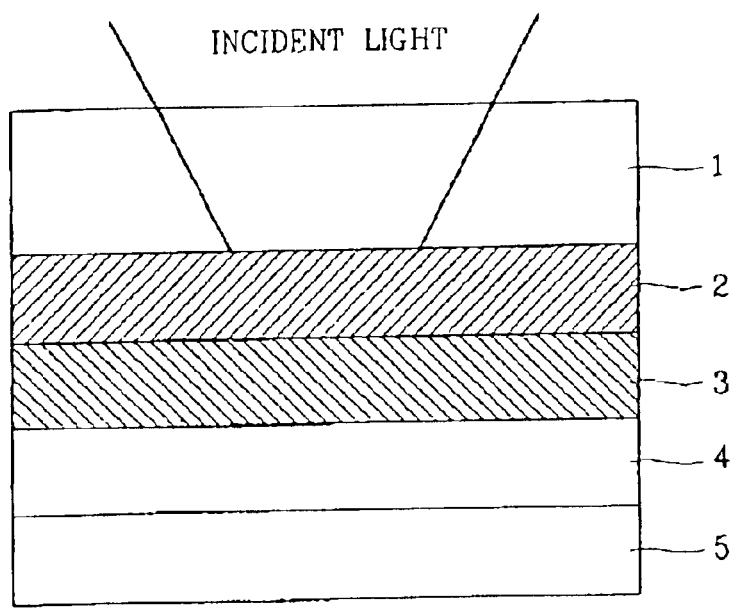
Figure 3C:
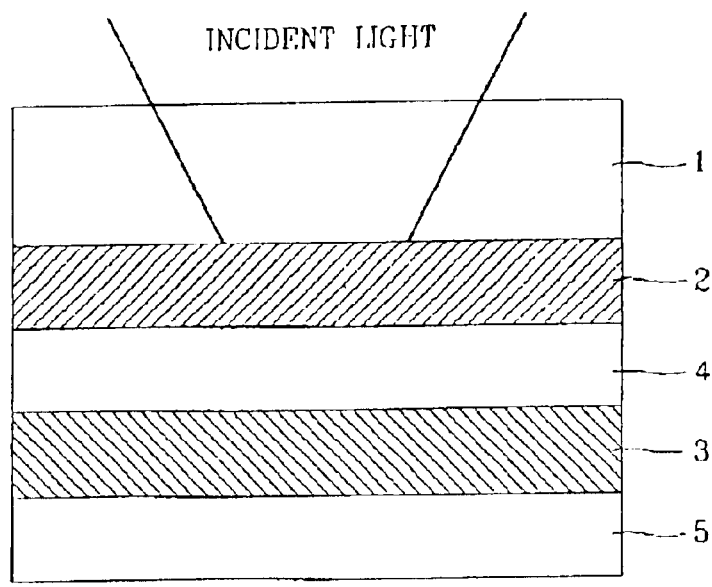

FIGS. 3A through 3C show basic constitutions of optical recording media using two super-resolution layers, providing respectively the first, the second and the third embodiment of the present invention. Regarding these Figures, a laser beam having a Gaussian intensity profile is focused by the objective lens and made incident on the medium with the FWHM spot size of $0.59\lambda/NA$ at diffraction limit. When the focused light is made incident from the substrate side, the incident layer 1 refers to a substrate, whereas it refers to a protective layer if the focused light is made incident from the surface of the multi-layer stacked on the substrate.

Regarding FIG. 3A, a remarkable feature of the proposed optical recording medium is that two super-resolution layers 2 and 3 are placed between the incident layer 1 and the recording layer 4 in order to take advantage of mutually complementing optical characteristics with respect to change in laser power so that the effective spot size of the laser light reaching the recording layer 4 can be reduced and maintained below the diffraction limited size while recording on and reproducing from the recording layer 4.

Super-resolution layer 3 placed closer to the recording layer 4 preferably has the function of reducing the spot size at a readout power. This is because a beam of light transmitted through an aperture in the super-resolution layer and thus with a spot size below the diffraction-limited size would diverge as it propagates away from the super-resolution layer toward the recording layer and, as a result, readout resolution tends to become worse with a distance from the aperture to the recording layer getting longer. Super-resolution layer 2 then preferably plays a primary role of maintaining the spot size below the diffraction-limited value at a recording power. A relatively large separation of the super-resolution layer 2 from the recording layer 4 would not be so much of a problem as compared to the case of the super-resolution layer 3 since a recorded mark size can be also controlled by means of recording conditions such as a laser heating time and a cooling time besides a control of the spot size.

FIG. 3B shows an embodiment in which the recording medium includes a reflection layer 5, and FIG. 3C shows an embodiment in which super-resolution layer 3, a primary controller of the readout spot size, is positioned between the recording layer 4 and the reflection layer 5, as might be required for a purposeful design of optical and thermal characteristics of a recording medium.

It should be mentioned that, in practice, a dielectric layer having a thickness in the range of 0~0.5 $\lambda$ ($\lambda$ is a used wavelength) is preferably placed between individual layers in the embodiments of FIGS. 3A through 3C, in order to prevent interlayer material diffusion and to control the optical and the thermal characteristics of a recording medium.

Based on the aforementioned classification of the kinds of super-resolution layers, various embodiments of optical recording media are possible but they can be grouped largely into two types depending on the kinds of super-resolution layers in combination. Embodiments according to the types of combination will now be described but the scope of the present invention is not limited thereto.

Figure 4:
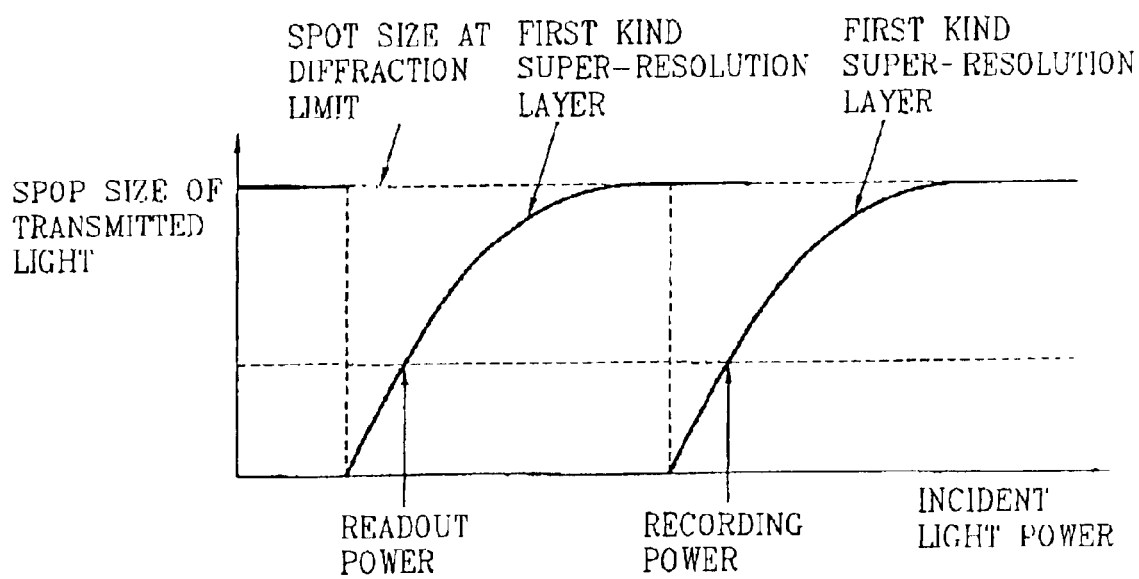
FIG. 4 is a schematic illustrating the principle of maintaining a spot size during readout and recording in case of combining two super-resolution layers of a first kind.

Combination of the first type is such that each of the upper and the lower super-resolution layers belongs to the super-resolution layer of a first kind, as shown in FIG. 4. In this type, the threshold light intensity (or temperature) of one layer is different from that of the other so that a spot size smaller than the diffraction limited size may be similarly obtained at a readout power and at a recording power as well.

Figure 5A:
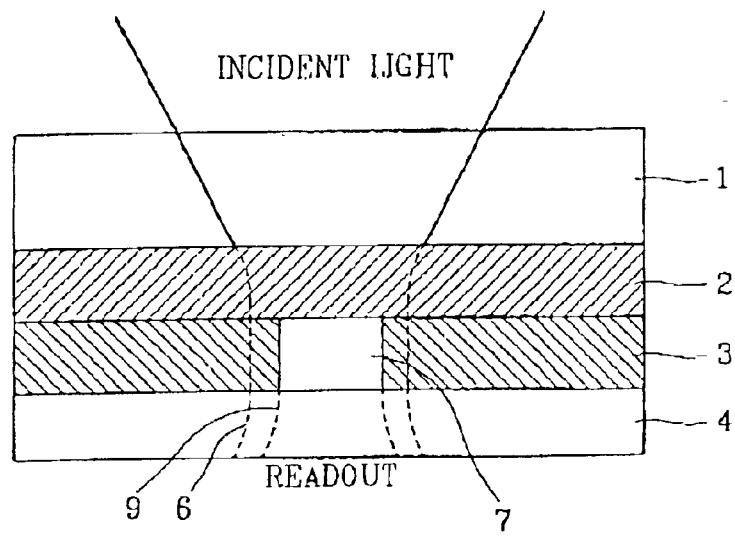
FIGS. 5A and 5B represent the optical recording media combining two super-resolution layers of a first kind, each illustrating the operation principle of reproducing information (FIG. 5A) and of recording information (FIG. 5B)
Figure 5B:
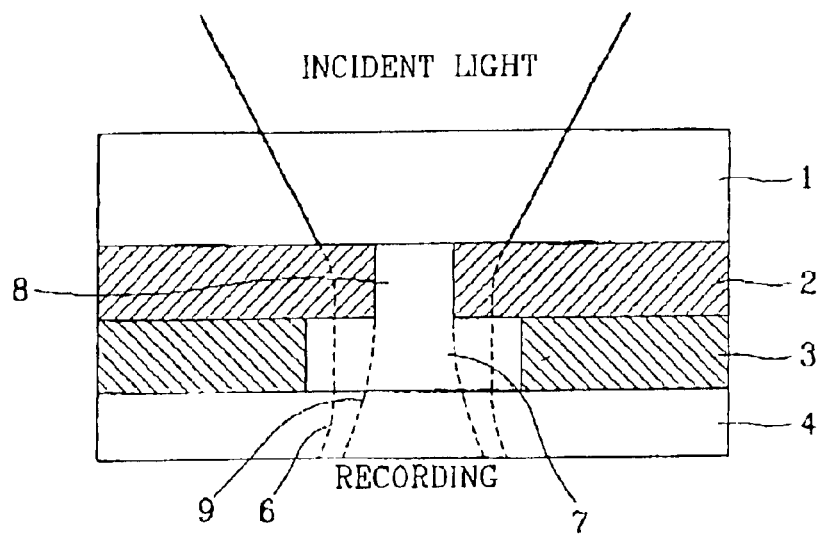

The operation principle of the first type during readout and recording is schematically shown in FIGS. 5A and 5B according to the embodiment shown in FIG. 3A. At a readout power, the aperture 7 forms only at the lower super-resolution layer 3 to yield a reduced spot size (refer to FIG. 5A) whereas, at a recording power, the aperture 7 expands to lose its function for spot size control but the aperture 8 newly formed in the super-resolution layer 2 (refer to FIG. 5B) takes the function. The lines 6 and 9 represent the FWHM loci in the intensity profiles of the incident beam and of the transmitted beam, respectively.

With respect to materials to implement a combination of the first type, various combinations are possible in principle between materials of either the same group or of different groups among the groups of phase change materials, thermochromic materials and photochromic materials.

To take one example, a phase change material such as Sn, Bi or Pb that has a low melting temperature and undergoes a significant change in the linear optical properties upon melting phase transition may be used as a super-resolution layer controlling the spot size for readout, in combination with a chalcogenide phase change material as a super-resolution layer controlling the spot size for recording.

Figure 6:
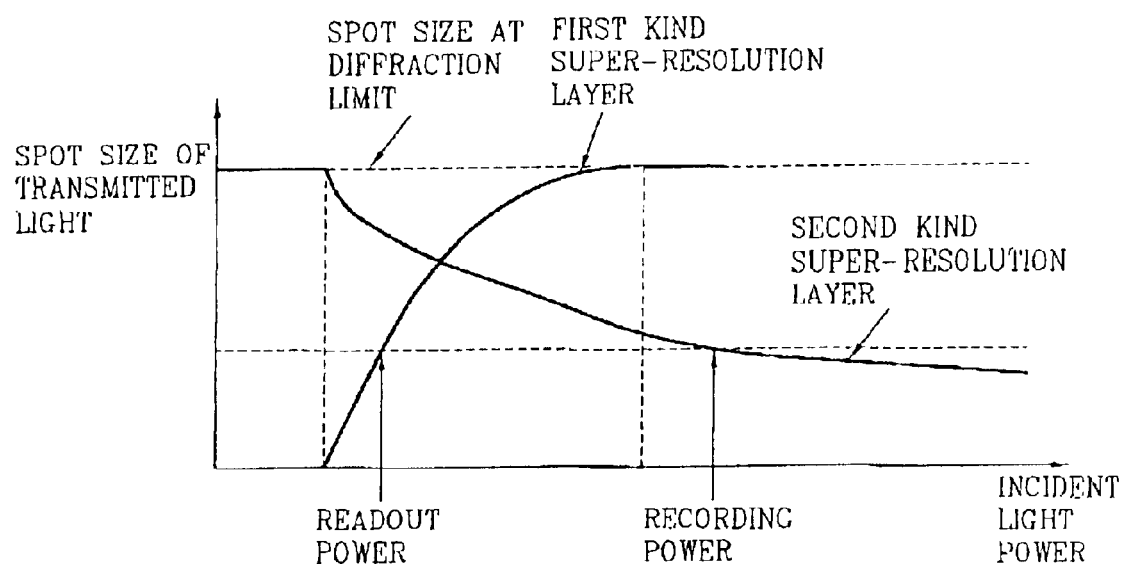
FIG. 6 is a schematic illustrating the principle of maintaining a spot size during readout and recording in case of combining a super-resolution layer of a is first kind with one of a second kind.

Combination of the second type is such that one super-resolution layer belongs to a first kind while the other super-resolution layer to a second kind as shown In FIG. 6.

Figure 7A:
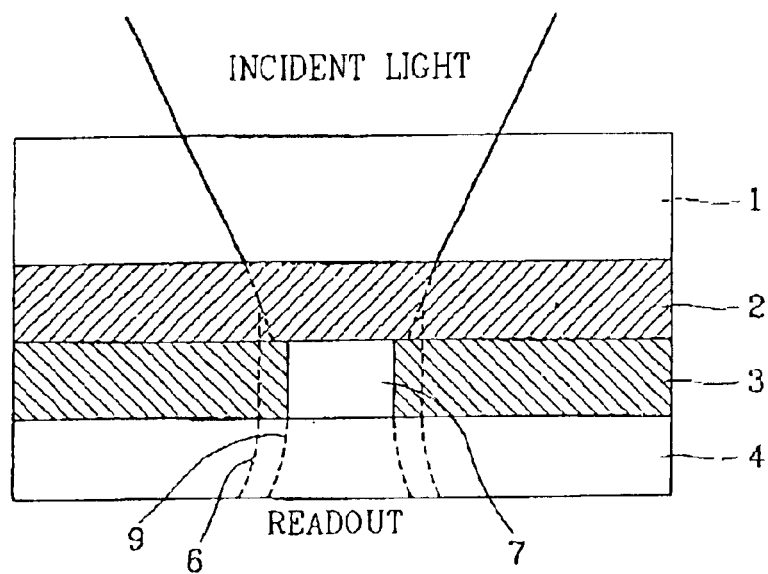
FIGS. 7A and 7B represent the optical recording media, combining a super-resolution layer of a first kind with one of a second kind, each illustrating the operation principle of reproducing information (FIG. 7A) and of recording information (FIG. 7B).
Figure 7B:
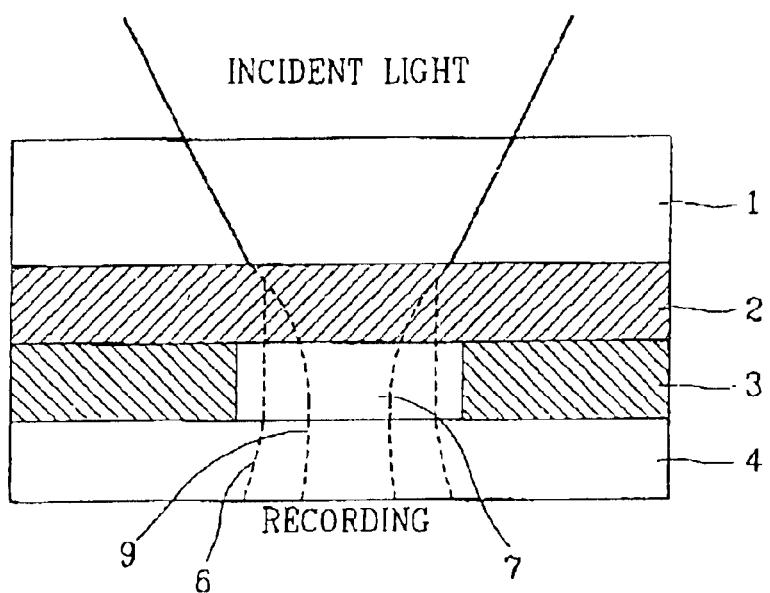

The operation principle of the second type during readout and recording is schematically shown in FIGS. 7A and 7B according to the embodiment shown in FIG. 3A.

During readout at a low light power, as shown in FIG. 7A, the super-resolution layer 2 of a second kind may exercise little effect on the reduction of a spot size but the super-resolution layer 3 of a first kind takes a control to yield a beam spot of less than a diffraction-limited size (7). During recording at a high light power, as shown in FIG. 7B, the super-resolution layer 3 of a first kind is unable to produce a reduced spot size any longer but the super-resolution layer 2 of a second kind acquires the ability so that a spot size comparable to the one for readout may be obtained (9).

In case of an optical recording medium with a reflection layer, the super-resolution layer 3 of a first kind controlling the spot size for readout is possibly placed between the recording layer 4 and the reflection layer 5 in the same manner as illustrated in FIG. 3C.

As examples of materials to implement a combination of the second type, phase change materials such as metals with low melting temperatures and chalcogenide phase change materials may be used for the super-resolution layer of a first kind; and self-focusing materials having large nonlinear refractive indices and with threshold intensities that can be far exceeded by the incident light intensity at a recording power, or saturable absorption materials experiencing large changes in optical transmittance with light intensity can be used for the super-resolution layer of a second kind.

The proposed optical recording media can be adopted to either recordable (or write-once) or rewritable media, according to use and depending on the type of recording layer materials. In case of the recordable optical recording media, Te, Te compounds, polymer dye materials or the like may be used as the recording layer materials and in case of the rewritable optical recording media, magneto-optical materials or chalcogenide phase change materials may be used as the recording layer materials.

As described so far, according to the optical recording medium of the present invention, it is possible to form a light beam spot having a size below a diffraction limited size and to maintain it in the range from readout to recording power by combining two super-resolution layers in a recording medium while using a far-field optic system with a spatial resolution limited by $\lambda$ and NA.

Therefore, even in a case that a spatial period between recorded marks is below $\lambda/2NA$, a readout signal can be obtained and a signal interference between adjacent tracks can be restrained. In addition, marks of sizes smaller than $\lambda/4NA$ can be stably recorded while restraining thermal interference between adjacent marks and tracks. Consequently, readout and recording of an ultra-high density optical information can be accomplished with the present invention.

As the present invention may be embodied in several forms without departing from the spirit or essential characteristics thereof, it should also be understood that the above-described embodiments are not limited by any of the details of the foregoing description, unless specified otherwise, but should rather be construed broadly within its spirit and scope as defined in the appended claims, and therefore all changes and modifications that fall within the meets and bounds of the claims, or equivalence of such meets and bounds are intended to be embraced by the appended claims.

What is claimed is:

1. A high density optical recording medium comprising:
   an incident layer on which light focused by a lens is irradiated;
   a first super-resolution layer for controlling the spot size of the irradiated focused light;
   a second super-resolution layer for controlling the spot size of the irradiated focused light; and
   a recording layer for recording information,
   wherein the first and second super-resolution layers are able to vary the spot size of transmitted light through change in optical transmittance with incident light power, and to vary the spot size of transmitted light complementarily in response to change in incident light power because of different threshold light intensities (temperatures) for the onset of change in optical transmittance, and
   in the first and the second super-resolution layers, the spot size of transmitted light increases with increasing incident light power, and in case of the first super-resolution layer, a threshold light intensity (or temperature) for the onset of change in optical transmittance is exceeded below a readout power for the recording medium, while, in case of the second super-resolution layer, a threshold light intensity is exceeded above a readout power and below a recording power.

2. The recording medium of claim 1, wherein the first and the second super-resolution layers are made respectively of a material displaying a discontinuous change of optical characteristics according to a change in structure or chemistry at a threshold light intensity (or temperature), that is, a thermochromic material, a photochromic material or a phase change material with a phase transition between solid phases or between a solid phase and a liquid phase or with a decomposition of a compound.

3. The recording medium of claim 1, has a structure comprising an incident layer, the second super-resolution layer, the first super-resolution layer and the recording layer in sequence.

4. The recording medium of claim 3, wherein a reflection layer is additionally formed below the recording layer.

5. The recording medium of claim 1 has a structure comprising an incident layer, the second super-resolution layer, the recording layer and the first super-resolution layer in sequence, and a reflection layer is additionally formed below the first super-resolution layer.

6. The recording medium of one of claims 3 through 5, wherein a dielectric layer having a thickness of 0~0.5$\lambda$ ($\lambda$ is a used layer wavelength) is formed between the constituent layers to prevent an interlayer material diffusion and to control the optical and the thermal characteristics of the recording medium.

7. The recording medium of claim 1, wherein the first super-resolution layer combined with the second super-resolution layer renders a beam spot of below a diffraction limited size at the recording layer and maintain it during readout and recording as well so as to record and reproduce information of a spatial frequency larger than 2NA/$\lambda$ ($\lambda$ is the wavelength of a used laser and NA is the numerical aperture of an objective lens) while restraining a signal interference and a thermal interference between adjacent tracks.

8. A high density optical recording medium comprising:
an incident layer on which light focused by a lens is irradiated;
a first super-resolution layer for controlling the spot size of the irradiated focused light;
a second super-resolution layer for controlling the spot size of the irradiated focused light; and
a recording layer for recording information,
wherein the first and second super-resolution layers are able to vary the spot size of transmitted light through change in optical transmittance with incident light power, and to vary the spot size of transmitted light complementarily in response to change in incident light power because of different threshold light intensities (temperatures) for the onset of change in optical transmittance, and
the spot size of transmitted light increases with increasing incident light power in the first super-resolution layer, and the spot size of transmitted light diminishes with increasing incident light power in the second super-resolution layer, and in case of the first super-resolution layer, the threshold light intensity (or temperature) for the onset of change in optical transmittance is exceeded below a readout power for the recording medium, while in case of the second super-resolution layer, the threshold light intensity is exceeded above or below a readout power and below a recording power.

9. The recording medium of claim 8, wherein the first super-resolution layer is made of a material displaying a discontinuous change of optical characteristic according to a change in structure or chemistry at a threshold light intensity (or temperature), that is, a thermochromic material, a photochromic material or a phase change material with a phase transition between solid phases or between a solid phase and a liquid phase or with a decomposition of a compound, and the second super-resolution layer is made of a self-focusing material having a third order nonlinear optical effect or a saturable-absorption material among materials of which optical characteristics vary continuously at a respective threshold light intensity (or temperature) and beyond.

10. The recording medium of claim 8 has a structure comprising an incident layer, the second super-resolution layer, the first super-resolution layer and the recording layer in sequence.

11. The recording medium of claim 10, wherein a reflection layer is additionally formed below the recording layer.

12. The recording medium of claim 8 has a structure comprising an incident layer, the second super-resolution layer, the recording layer and the first super-resolution layer in sequence, and a reflection layer is additionally formed below the first super-resolution layer.

13. The recording medium of one of claims 10 through 12, wherein a dielectric layer having a thickness of 0~0.5$\lambda$ ($\lambda$ is a used layer wavelength) is formed between the constituent layers to prevent an interlayer material diffusion and to control the optical and the thermal characteristics of the recording medium.

14. The recording medium of claim 8, wherein the first super-resolution layer combined with the second super-resolution layer renders a beam spot of below a diffraction limited size at the recording layer and maintain it during readout and recording as well so as to record and reproduce information of a spatial frequency larger than 2NA/$\lambda$ ($\lambda$ is the wavelength of a used laser and NA is the numerical aperture of an objective lens) while restraining a signal interference and a thermal interference between adjacent tracks.

* * * * *